US012755612B2

(12) United States Patent
Farahi

(10) Patent No.: US 12,755,612 B2
(45) Date of Patent: Oct. 6, 2026

(54) BLIND SPORTS BETTING

(71) Applicant: David Jacques Farahi, Denver, CO (US)

(72) Inventor: David Jacques Farahi, Denver, CO (US)

( * ) Notice: Subject to any disclaimer, the term of this patent is extended or adjusted under 35 U.S.C. 154(b) by 398 days.

(21) Appl. No.: 18/507,030

(22) Filed: Nov. 11, 2023

(65) Prior Publication Data

US 2024/0290177 A1 Aug. 29, 2024

Related U.S. Application Data

(60) Provisional application No. 63/447,989, filed on Feb. 24, 2023.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3288* (2013.01); *G07F 17/3211* (2013.01); *G07F 17/323* (2013.01); *G07F 17/3262* (2013.01)

(58) Field of Classification Search
CPC .. G07F 17/32; G07F 17/3201; G07F 17/3214; G07F 17/3222
USPC .............................. 463/1, 10, 20, 22, 25, 39
See application file for complete search history.

(56) References Cited

U.S. PATENT DOCUMENTS

| | | | | |
|---|---|---|---|---|
| 5,573,244 | A | 11/1996 | Mindes | |
| 5,842,921 | A | 12/1998 | Mindes et al. | |
| 7,775,880 | B2 | 8/2010 | Downes | |
| 7,837,560 | B2 | 11/2010 | Wiltshire et al. | |
| 8,417,626 | B2 | 4/2013 | Crosthwaite et al. | |
| 8,764,556 | B2 | 7/2014 | Corbo | |
| 2004/0147312 | A1 | 7/2004 | Aronson et al. | |
| 2008/0268930 | A1* | 10/2008 | Miller | A63F 13/10 463/6 |

(Continued)

OTHER PUBLICATIONS

International Search Report and Written Opinion for PCT/US2024/012878 dated Apr. 30, 2024, 13 pages.

*Primary Examiner* — Adetokunbo O Torimiro
(74) *Attorney, Agent, or Firm* — Michael A. Kerr; Kerr IP Group, LLC

(57) ABSTRACT

A sport betting system and method that mitigates risk to a sportsbook operator is described. The sport betting system includes a first client device, a second client device, and a sportsbook network component that includes a blind sport betting module. The first client device displays a first user interface that receives a first wager amount associated with a sportsbook outcome and requests a blind bet binary outcome. The second client device displays a second user interface that receives a second wager amount and a second user-selected binary outcome associated with the sportsbook outcome. The blind sport betting module determines a potential sportsbook loss corresponding to the second wager amount and the second user-selected predicted outcome and mitigates the potential sportsbook loss by determining the blind bet binary outcome that is in binary opposition to the second user-selected binary outcome. The blind sport betting module communicates the blind bet binary outcome to the first client device.

20 Claims, 12 Drawing Sheets

(56) References Cited

U.S. PATENT DOCUMENTS

| | | | | |
|---|---|---|---|---|
| 2012/0256377 | A1* | 10/2012 | Schneider | G07F 17/326<br>463/13 |
| 2013/0178270 | A1 | 7/2013 | Flaherty et al. | |
| 2018/0357857 | A1 | 12/2018 | Simon et al. | |
| 2019/0287351 | A1 | 9/2019 | Russell et al. | |
| 2021/0097819 | A1 | 4/2021 | Bilzerian | |
| 2022/0005321 | A1* | 1/2022 | Wexler | G07F 17/3244 |
| 2022/0180703 | A1 | 6/2022 | Huke et al. | |
| 2022/0335559 | A1* | 10/2022 | Black | G07F 17/3237 |

* cited by examiner

BLIND SPORTS BETTING

CROSS REFERENCE

This patent application which claims the benefit of provisional patent application 63/447,989 entitled A SYSTEM AND METHOD FOR OPTIMIZING OPERATION OF A SPORTSBOOK filed on Feb. 24, 2023; and the patent application identified above is incorporated by reference in this patent application in its entirety.

FIELD

The present disclosure is related to blind sports betting. More specifically, this disclosure is directed to blind betting to mitigate risk to the sportsbook operator during a sports betting session while at the same time providing a quick and simple betting scheme for the bettor.

BACKGROUND

Wagering is as old as the Roman circus where event outcomes were bet upon amongst spectators. In time, wagers evolved from betting between individuals to betting as part of a pool of bets, which further evolved into the modern Sportsbook.

The modern sportsbook can take many forms. For example, players can wager on the winner of a specific game, the total points scored, the player to score the most points, the team to win the championship before the championship game, the team to win the season as a whole and other such sporting related outcomes. In some jurisdictions, players can also wager on the outcome of political elections or awards for the performing arts, among other events.

A sportsbook rarely receives an exactly even amount of money wagered on the various sides of a given event outcome. As such, the sportsbook has liability on certain outcomes, and at times, the liability can be quite large because most players, or most of the money, was wagered on the same outcome.

The sportsbook is continuously trying to mitigate the risk of paying out more than it takes in on any given bet. One way to mitigate risk is to provide players with odds to incentivize them to bet on an outcome that is not favored, however, getting players to wager on an undesirable team can be challenging.

Thus, there is a need for the sportsbook to reduce their liability by attracting wagers which mitigate total liability at payout.

Additionally, novice players are regularly confused by the way betting lines are presented and, as a result, novice players are hindered from placing a wager because they do not understand what all of the odds and wagering mean. Furthermore, there are instances when a player (expert or novice) does not want to select a desired outcome for an event. Instead, the player just wants some action on the event, but has no basis for selecting the outcome to an event.

Thus, a sportsbook operator wants to increase sports betting wagers while at the same time managing and mitigating risk.

Accordingly, a structure and methodology for optimizing the operation of a sportsbook for both the sportsbook operator and the player is desired.

SUMMARY

A sport betting system and method that mitigates risk to a sportsbook operator is described. The sport betting system includes a first client device, a second client device, and a sportsbook network component that includes a blind sport betting module. The first client device displays a first user interface that receives a first wager amount associated with a sportsbook outcome and requests a blind bet binary outcome. The first user interface is absent a first user-selected binary outcome associated with a sportsbook outcome. The second client device displays a second user interface that receives a second wager amount and a second user-selected binary outcome associated with the sportsbook outcome.

The sportsbook network component is communicatively coupled to the first client device and the second client device. The sportsbook network component receives the first wager amount, the request for the blind bet binary outcome, the second wager amount, and the second user-selected binary outcome associated with the second wager amount.

The blind sport betting module determines a potential sportsbook loss corresponding to the second wager amount and the second user-selected predicted outcome. The blind sport betting module mitigates the potential sportsbook loss by determining the blind bet binary outcome that is in binary opposition to the second user-selected binary outcome. The blind sport betting module communicates the blind bet binary outcome to the first client device.

In an illustrative embodiment, the sport betting system includes a plurality of standard client devices, in which each standard client device includes a user interface that receives a wager amount and a user-selected binary outcome for the sportsbook outcome. The blind sport betting module determines the potential sportsbook loss for the sportsbook outcome by aggregating the wager amounts for the user-selected binary outcomes.

In another illustrative embodiment, the sport betting system includes a plurality of blind bet client devices, in which each blind bet client device receives a wager amount and a blind bet binary outcome from the blind sport betting module.

In yet another illustrative embodiment the sportsbook outcome includes a final game outcome. In a further illustrative embodiment, the sportsbook outcome includes at least one prop bet outcome.

In an even further illustrative embodiment, the first wager amount, the blind bet binary outcome, the second wager amount, and the second user-selected binary outcome associated with the second wager amount are received by the blind betting module before a resulting sportsbook outcome.

In still further illustrative embodiment, the blind sports betting module includes a bet determination wheel that further includes a plurality of sportsbook outcomes, in which one of the sportsbook outcomes is randomly selected.

BRIEF DESCRIPTION OF DRAWINGS

The present invention will be more fully understood by reference to the following drawings which are presented for illustrative, not limiting, purposes.

DESCRIPTION

Figure 1A:
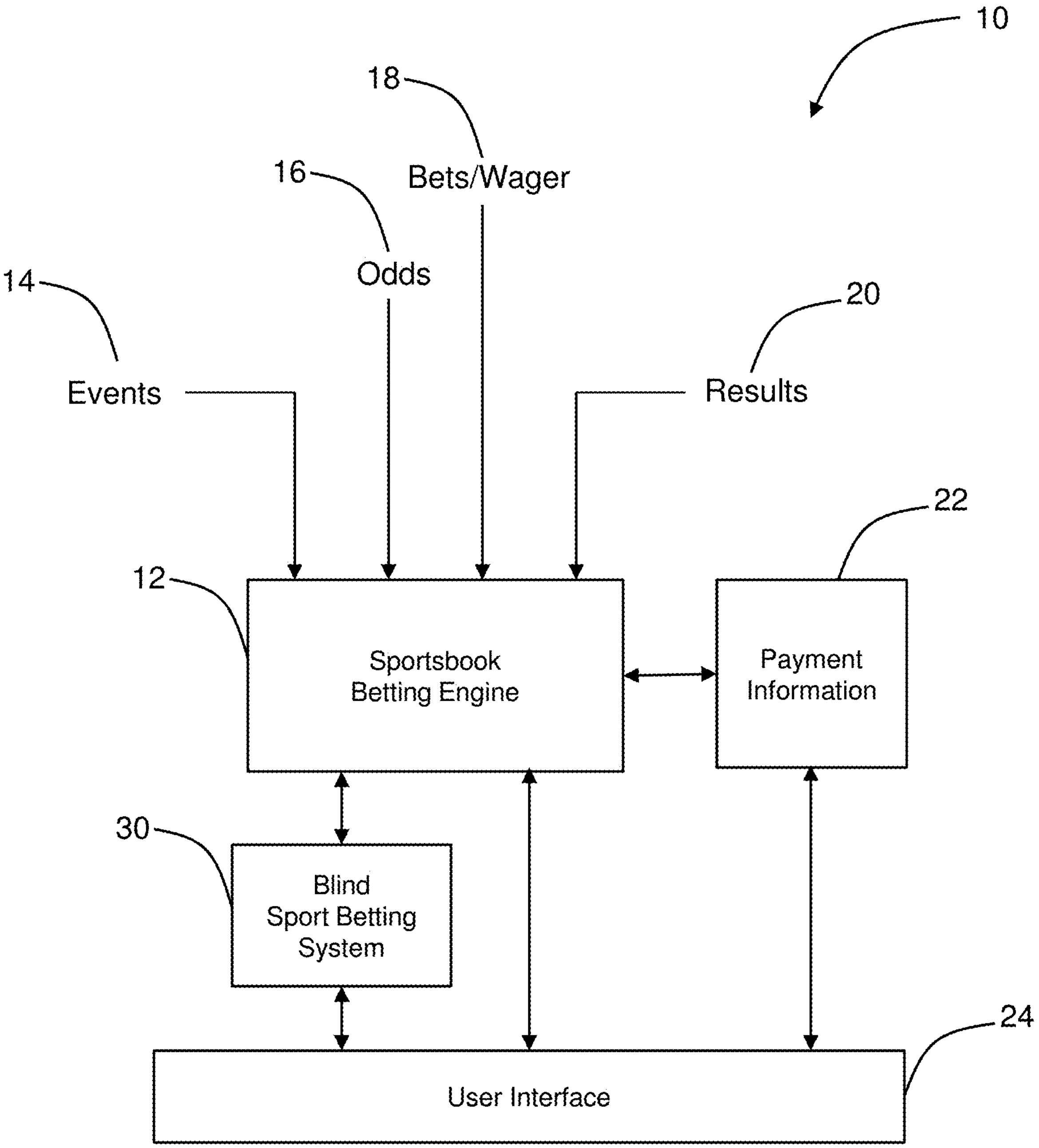
FIG. 1A shows a high-level system diagram of an illustrative sports betting system that includes a blind sport betting system.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, methods, and apparatuses described hereinafter may vary as to configuration and as to details. The systems may vary as to details and particular embodiments that reside on the network side and the elements that reside on the client side. Also, the methods may vary as to details, order of the actions, or other variations without departing from the illustrative methods disclosed here in. Additionally, the apparatuses may vary as to details such as size, configuration, mechanical elements, material properties, housings, and other such parameters.

The blind bet systems and methods described herein detect an imbalance in a sportsbook and use this imbalance to offer easy bets to novice players.

Commonly, a sportsbook operator has liability on certain outcomes, and at times, a large liability on certain outcomes because the majority of players or the majority of money is wagered on the same outcome. Thus, sportsbook would like to reduce their liability by attracting wagers on the opposing outcome. A "sportsbook operator" sets lines and processes wagers based on event outcomes and prop bet outcomes and earns a "vigorish" as revenue for the risk taken by accepting wagers, which are interchangeably referred to as "bets." Vigorish is the amount charged by the sportsbook for taking wagers. A "line" refers to betting odds posted by a bookmaker. An "event" includes, by way of example and not of limitation, a sporting match, a game, an election, a competition, and any such competition that identifies a winning outcome. A "prop bet" (also referred to as a "proposition wager") is a wager that is not directly based on the final outcome of the event. "Liability" is the amount the sportsbook will lose, i.e., pay out to players, for a specific event outcome or prop bet outcome.

The blind sports betting systems and methods described herein provide a risk mitigation tool for sportsbook operators that reduce their financial liability on any given event outcome or prop bet outcome. In other words, the blind sports betting systems and methods improves the sportsbook operator's' revenue by reducing the sportsbook liability risk. Additionally, the blind sports betting systems and methods enable the player to have some "action" on the sporting event outcome without having to deal with complex wagering and jargon. Note, the term "action" refers to a player having money at risk, i.e., a wager, for a particular outcome. Furthermore, players are commonly confused by the way betting lines are presented, inhibiting their desire to place a wager and purchase action and the blind sports betting systems and methods simplify the wagering process.

In operation, the blind sports betting systems and methods described assist the player, which is also referred to interchangeably as the "blind bettor," in selecting one or more event outcomes for a player selected event and player selected wager. More specifically, the blind sports betting systems and methods include a blind sport betting system that determines the event outcome for the player selected wager and the player selected game event. The blind sport betting system described in further detail in this description includes one or more algorithms that determine the sportsbook liability for a plurality of event outcomes and prop bet outcomes.

FIG. 1A shows a high-level system diagram of an illustrative sports betting system that includes a blind sport betting system. The sports betting system 10 operates in an illustrative client-server architecture 100, shown in FIG. 2, that executes the blind sport betting operations according to various embodiments described herein. The illustrative sport betting system 10 includes a sportsbook betting engine 12 for sporting events 14.

The sport betting engine 12 generates odds 16 and handles taking and registering bets 18 for one or more sporting events 14. The sports betting engine may also be referred to as a sports betting liability management system.

During the sporting event and after the sporting event is completed the results 20 are communicated to the player. After the sporting event is completed, the results 20 may also be communicated to the player. Payment information 22 provided to the player includes received wagers and payouts.

Figure 2:
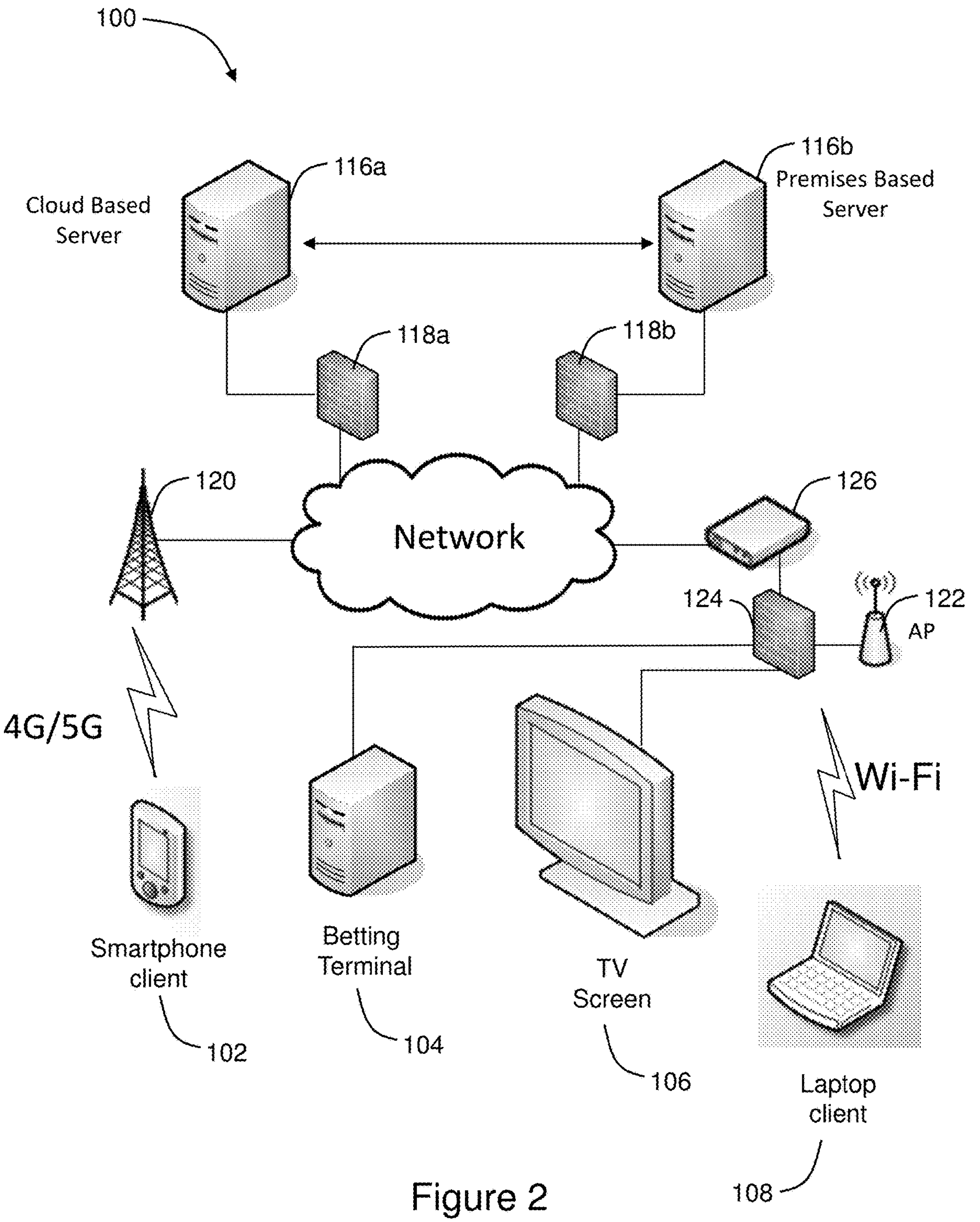
FIG. 2 shows an illustrative sports betting system that includes a blind sport betting system embodied in an illustrative client-server architecture 100.

A user interface (UI) 24 disposed on a plurality of client devices 102, 104, 106, and 108 shown in FIG. 2 communicates the sporting event 14, odds 16, bets 18, results 20, and payment information 22. The user interface 24 is an interface between a player and a client device.

The sports betting system 10 may also be communicatively coupled to other computer systems such as casino or hotel loyalty systems, reservations systems, in-room television viewing systems, gambling floor kiosks systems, or other such casino systems. The payment information 22 includes a payment component so a player may be able to pay for a bet through a smartphone, a casino cashier, a kiosk or other such payment means. Player information may also be entered into a payment system component. Player information that may be input includes name, address, telephone number and age, and payment information may include a credit or debit card number or loyalty account information.

A sports and event betting system according to various embodiments may be comprised of several components for performing specific functions. These components may include, for example, storage means that store data structures having information relating to betting events and odds. For example, such information may include event date, time, and location, bettor's betting and win history, and event odds and their dependence upon time of payment. A sports and event betting system may also include components to access payment and payout data structures.

It should be noted that user interface 24 in FIG. 1A may be displayed at a single kiosk, such as a betting window, and/or may be performed by thousands of players at their own respective client devices that can receive an application or downloadable software.

Figure 1B:
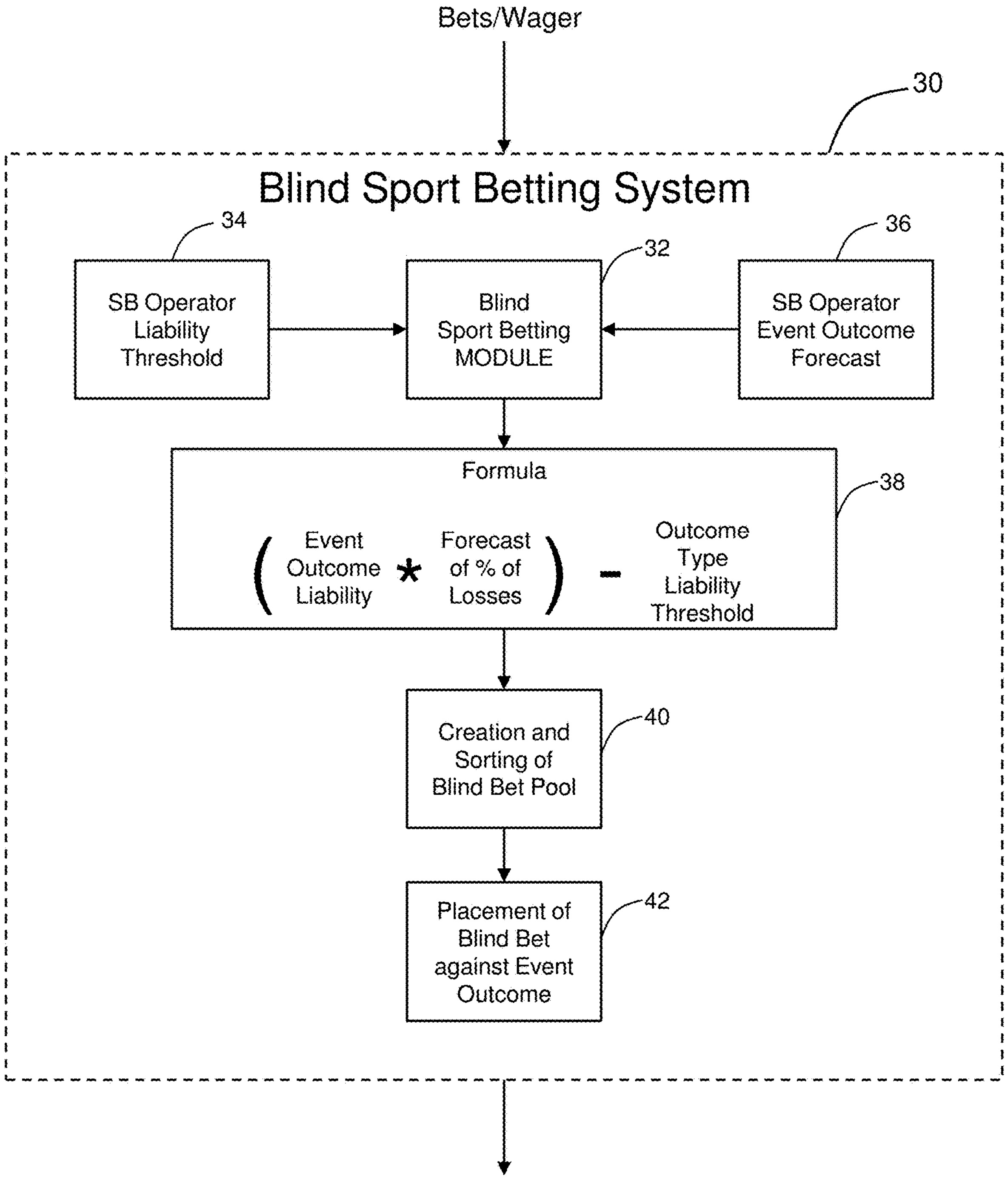
FIG. 1B shows an exploded view of the blind sport betting system.

FIG. 1B shows an exploded view of the blind sport betting system. The blind sport betting system 30 receives information regarding all bets currently outstanding as a function of dollars wagered and potential outcomes for each marketplace of dollars wagered.

Blind sport betting system 30 includes a blind sport betting module 32 that receives a sportsbook liability threshold input 34. The sportsbook threshold input 34 is the maximum dollar amount the system is allowed to process for any single wager on a discrete outcome. The sportsbook liability threshold input 34 is used by the sportsbook operator to determine the maximum liability they are willing to take on any given outcome.

As a function of the input sportsbook liability threshold 34, blind sport betting module 32 applies the outcome type liability threshold 34, which may be set universally or on an event-by-event basis. By way of non-limiting example, the input may set a target maximum of $100,000 liability for an outcome of a professional baseball game, and a $50,000 threshold for a professional basketball game. The system will then direct blind sports bets to achieve optimum liability by outcome as set by the liability threshold.

Additionally, blind sport betting module 32 receives a sportsbook operator event outcome forecast input 36. The sportsbook operator event outcome forecast input 36 is the likelihood of a specific outcome as determined by the sportsbook.

Blind sport betting module 32 reviews all existing bets on every event outcome and calculates the present outcome liabilities of each using an engine 38 applying the formula to all outcomes to increase or reduce the outcome liability by factor of the forecast model's prediction.

One illustrative example of the engine 38 formula provides for multiplying the event outcome liability by a forecast of the percent likelihood that the event does not occur less the outcome type liability threshold. The event outcome liability is the payout if an event occurs.

For example, if blind sport betting module 32 determines that team A will win against team B with an eighty percent (80%) certainty, blind sport betting module 32 will reduce the dollar value of the projected payout for team B winning by eighty percent (80%).

Blind sport betting system 30 creates a variety of outcomes which are relevant to how the blind bet is placed in operation 40. At block 42, the blind sport betting system 30 then sorts the entire sportsbook of event outcomes by largest to smallest as a function of liability after considering the forecast model and chosen thresholds.

In summary, after the blind sport betting system 30 receives the blind bet from user interface 24, the blind sport betting system 30 then selects to place the blind bet on the event outcome which reduces liability in the most desired way as determined by the sportsbook operator, given all the wagers the sportsbook operator has accepted at that time, or expects to accept on the selected event. The sportsbook operator immediately informs the BLIND player which outcome their wager has been placed on. By doing this the BLIND player now knows what event outcome is needed for their bet to win, or said another way, paid.

With respect to analytics, the blind sport betting system generates data for variables such as quantity, velocity, and value of blind bets for different bets and different events. The blind sport betting system data predicts the amount and types of blind bets expected for future events, which can then be used to set a better, more informed line and/or price for future events.

FIG. 2 shows an illustrative sports betting system 100 that includes a blind sport betting system embodied in an illustrative client-server architecture 100. There are four illustrative client devices presented in FIG. 2, namely, a smartphone 102, a betting terminal 104, a smart TV screen 106, and a laptop client 108. These illustrative client devices 102 through 108 are communicatively coupled to one or more network components 116*a* and 116*b*, which includes by way of example and not of limitation an illustrative web application server 116. In one embodiment, the web application server 116*a* is disposed in a network cloud. In another embodiment, the web application server 116*b* is disposed on a premises-based server. In certain embodiments, the network component may be a hybrid that includes the premises-based server 116*b* and the cloud-based server 116*a*.

The illustrative sport betting system 100 includes a first client device 102, a second client device 104, and a sportsbook network component 116 that includes a blind sport betting module 30. In operation, the first client device 102 displays a first user interface that receives a first wager amount associated with a sportsbook outcome and requests a blind bet binary outcome. The first user interface is absent a first user-selected binary outcome associated with a sportsbook outcome. The second client device 104 displays a second user interface that receives a second wager amount and a second user-selected binary outcome associated with the sportsbook outcome.

Referring to FIG. 1 and FIG. 2, the sportsbook network component 10, 100 is communicatively coupled to the first client device 102 and the second client device 104. In operation, the sportsbook network component 10, 100 receives the first wager amount, the request for the blind bet binary outcome, the second wager amount, and the second user-selected binary outcome associated with the second wager amount.

The blind sport betting module 30 determines a potential sportsbook loss corresponding to the second wager amount and the second user-selected predicted outcome. In operation, the blind sport betting module 30 mitigates the potential sportsbook loss by determining the blind bet binary outcome that is in binary opposition to the second user-selected binary outcome. The blind sport betting module 30 communicates the blind bet binary outcome to the first client device 102.

The illustrative network or cloud-based web application server 116*a* and premises-based web application server 116*b* are both behind an illustrative hardware firewall 118*a* and 118*b*, respectively. Alternatively, communications with the web applications servers may be performed using a virtual private network (VPN) that does not require a hardware firewall and operates as a "software" firewall. In one illustrative embodiment, the network communications include wirelessly communicating with an illustrative base station 120 that is managed by a wireless carrier. Alternatively, communications with the remote sensing device 100 include an illustrative Wi-Fi access point 122 that operates behind a software or hardware firewall 124, which Wi-Fi access point 122 is communicatively coupled to a modem 126 that, in turn, is communicatively coupled to the Internet.

Illustrative network component 116 includes a database (not shown) that receives wagers resulting in different liabilities by the sportsbook. More specifically, odds change over time. Thus, if someone picks Team A to win a championship ahead of the season, the odds will be very different than if the same bet is made ahead of the playoffs. The odds may change if the gambler is willing to give or take points for one team over the other as well as select the outcome, as well as a function as money wagered for the outcome of the same event, but each with a slight variation.

The illustrative network component 116 may be embodied as a web application server that further includes the database described above. The illustrative web application server 116 may be embodied as one of four fundamental cloud service models, namely, infrastructure as a service (IaaS), platform as a service (PaaS), software as a service (Saas), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as instances, are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet can be used, or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand so that the cloud end user does not have to allocate resources manually.

Software as a service (SaaS) enables cloud providers to install and operate application software in the cloud. Cloud end users access the software from cloud clients. The cloud end users do not manage the cloud infrastructure and platform that run the application. The SaaS application is different from other applications because of scalability. Scalability can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), in which the capability provided to the cloud service end user is to use network/transport connectivity services, inter-cloud network connectivity services, or the combination of both. Naas involves the optimization of resource allocations by considering network and computing resources as a unified whole, and traditional NaaS services which include flexible and extended VPN and bandwidth on demand.

In addition to the smartphone 102, betting terminal 104, smart TV screen 106, and laptop client 108, other "cloud" clients may access the networked module 116. These client devices include, but are not limited to, desktop computers, tablets, and embedded systems such as gateways. Some of these cloud clients rely on cloud computing for all or a majority of their applications. Many cloud applications do not require specific software on the client device and instead use a web browser to interact with the cloud application. Tools such as Kafka can be used to provide a reliable streaming infrastructure, messaging, storage, cache, and processing of data.

Figure 3:
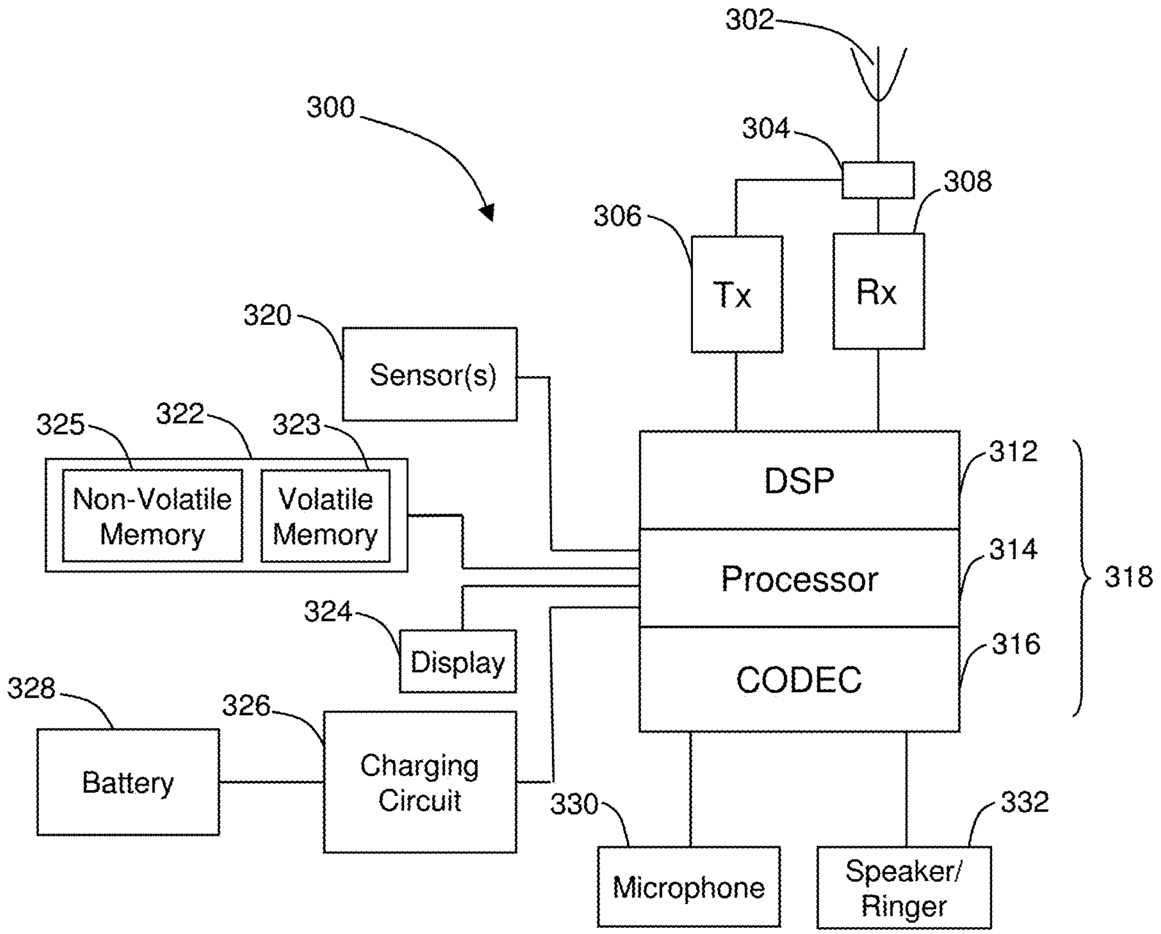
FIG. 3 shows the electrical components for an illustrative smartphone 300.

Referring to FIG. 3, there are shown the electrical components for an illustrative smartphone 300. For purposes of this patent, the illustrative smartphone 300 is a multimode wireless device that includes a first antenna element 302 that is operatively coupled to a duplexer 304, which is operatively coupled to a multimode transmitter module 306, and a multimode receiver module 308.

An illustrative control module 318 includes a digital signal processor (DSP) 312, a processor 314, and a CODEC 316. The control module 318 is communicatively coupled to the transmitter 306 and receiver 308. The transmitter module and receiver module are typically paired and may be embodied as a transceiver. The illustrative transmitter 306, receiver 308, or transceiver is communicatively coupled to antenna element 302.

The DSP 312 may be configured to perform a variety of operations such as controlling the antenna 302, the multimode transmitter module 306, and the multimode receiver module 308. The processor 314 is operatively coupled to a sensor 320, such as a camera. In operation, the camera sensor 320 is configured to be managed and controlled by the smartphone processor.

The processor 314 is also operatively coupled to a memory 322, a display 324, and a charging circuit 326. The charging circuit is operatively coupled to a smartphone battery 328.

Additionally, the processor 314 is also operatively coupled to the CODEC module 316 that performs the encoding and decoding operations and is communicatively coupled to a microphone 330 and a speaker 332. The CODEC module 316 is also communicatively coupled to the display 324 and provides the encoding and decoding operations of captured video.

Memory 322 includes two different types of memory, namely, volatile memory 323 and non-volatile memory 325. The volatile memory 323 is computer memory that requires power to maintain the stored information, such as random access memory (RAM). The non-volatile memory 325 can retain stored information even when the wireless communication device 300 is not powered up. Some illustrative examples of non-volatile memory 325 include flash memory, ROM memory, and hard drive memory.

Smartphone 300 may also be referred to as a mobile handset, mobile phone, wireless phone, portable cell phone, cellular phone, portable phone, a personal digital assistant (PDA), a tablet, a portable media device, a wearable computer, or any type of mobile terminal which is regularly carried by an end user and has all the elements necessary for operation in the remote sensing system. The wireless communications include, by way of example and not of limitation, 3G, 4G, 5G, 6G, LTE, CDMA, WCDMA, GSM, UMTS, or any other wireless communication system such as wireless local area network (WLAN), Wi-Fi or WiMAX. Additionally, the smartphone 300 may also be connected via USB (or via the Microcontroller) to an external Satellite modem to provide an alternative to Mobile or Wi-Fi for WAN connection.

Figure 4:
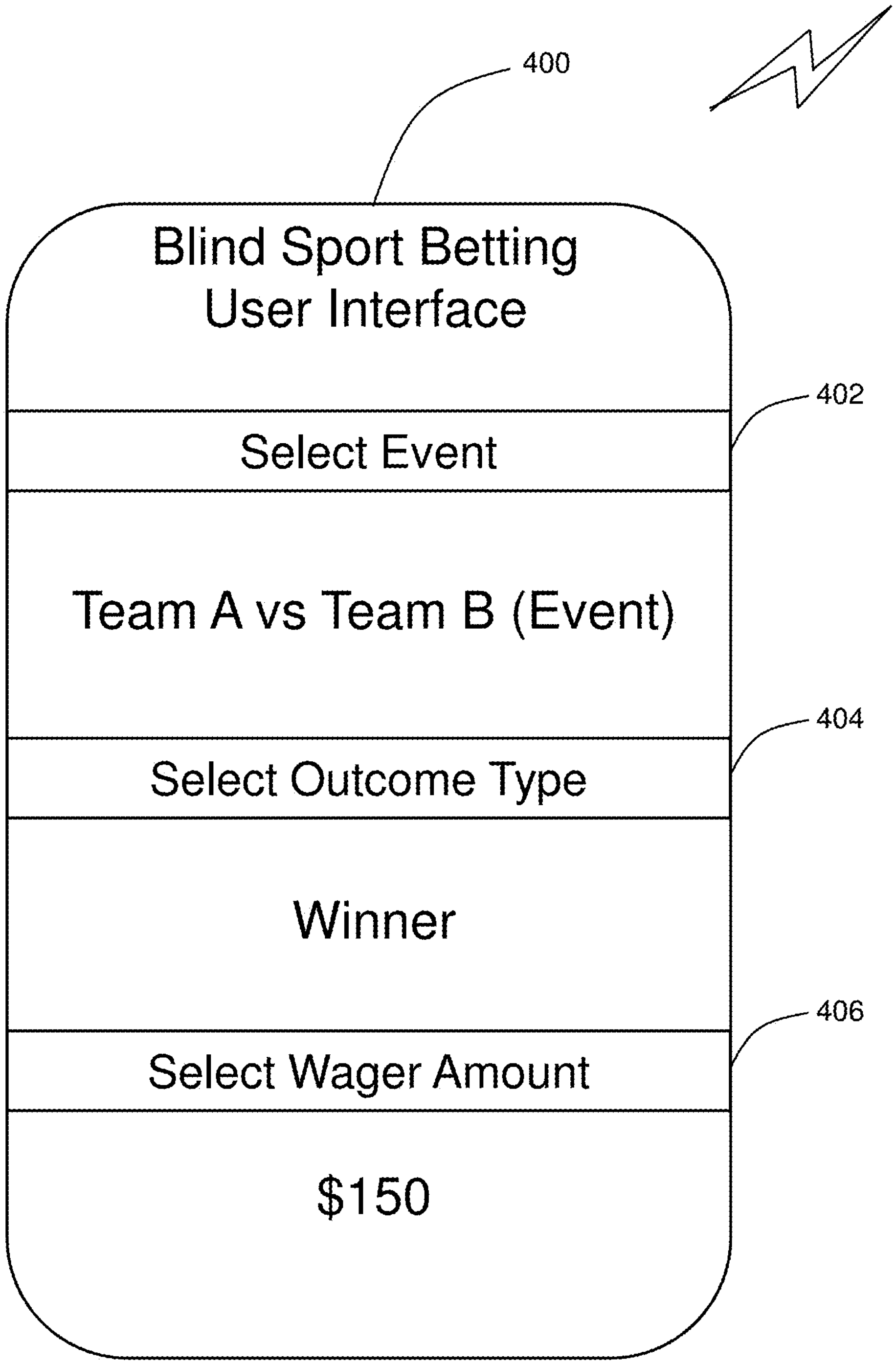
FIG. 4 shows an illustrative smartphone blind bet user interface that receives a blind sport betting wager.

Referring to FIG. 4 there is shown an illustrative smartphone blind bet user interface that receives a blind sport betting wager. The blind bet user interface 400 receives player instructions to select an event 402, select an outcome type 404, and select a wager amount 406. The wager of $150 is received at the wager amount 406 prompt.

The player also selects the event for Team A vs Team B at the select an event 402 prompt. Also, the player selects an outcome type 404, such as "winner." Note, the player does not select the winning or losing team—this selection process is performed by the blind sport betting system 30 (shown in FIG. 1) interacting with the betting engine 12. The blind bet user interface prompts a player to select an event and an outcome for which a wager is to be made, but not the expected game outcome itself. Thus, the selection of a "winner" for the select outcome type 404 field is a non-limiting selection that does not identify the winner, just that the blind bet relates to the winner of the game or the game outcome. Recall, the betting engine supports other types of wagers such as prop bets, which are not dependent on the game outcome.

It should be noted that unlike sophisticated wagerers, novice sports bettors not only may not care about the odds, but also may not even understand them, as they just want "action" on the event they are viewing or attending to make the event more engaging for the novice bettor.

Figure 5:
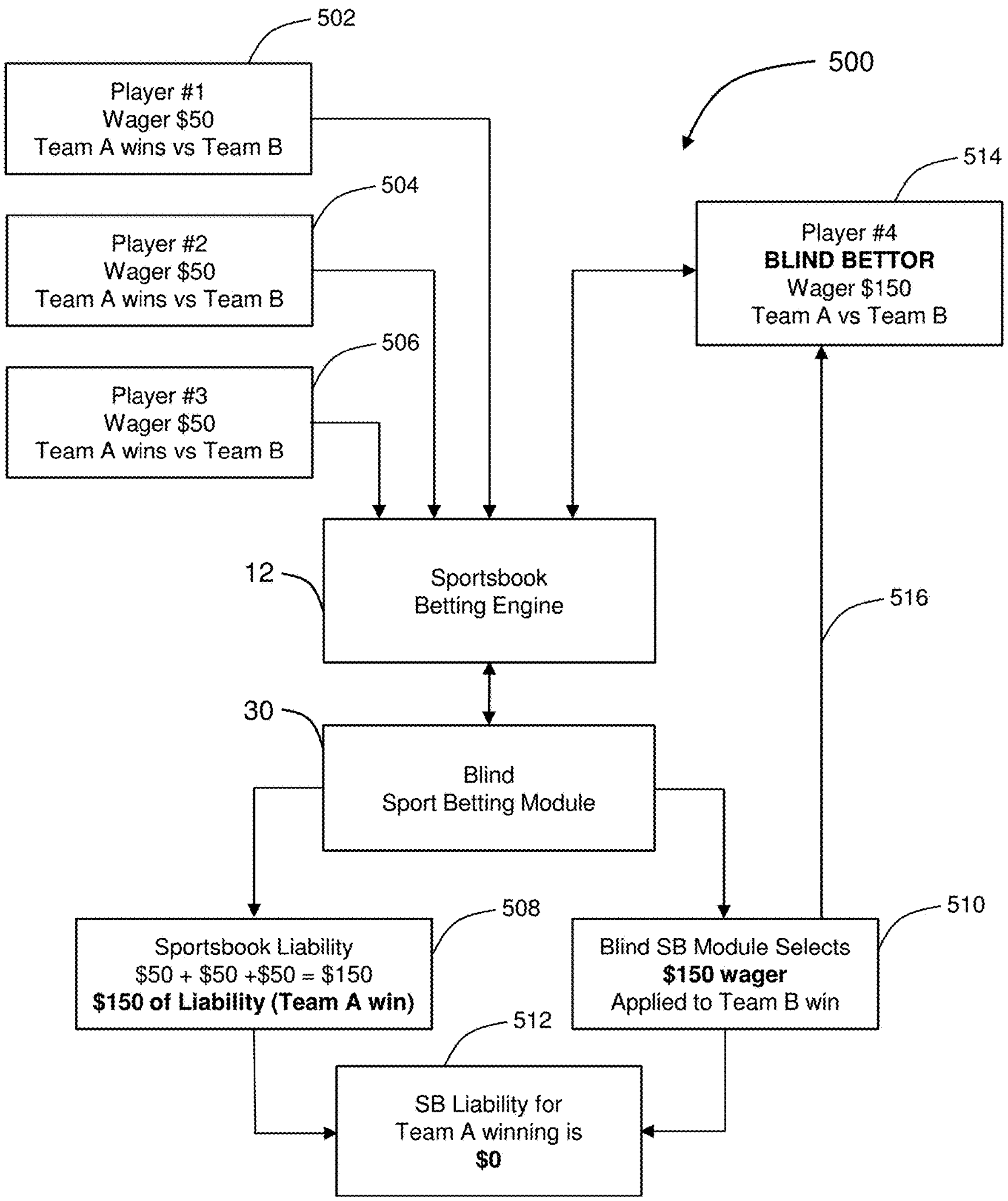
FIG. 5 shows a first illustrative operational flow chart for the blind sport betting system that results in zero sportsbook liability.

Referring to FIG. 5 there is shown a first illustrative operational flow chart for the blind sport betting system that results in zero sportsbook liability. The operational flow chart includes two system elements, namely, the sportsbook betting engine 12 and the blind sport betting module 30. However, the sportsbook betting engine 12 and the blind sport betting module 30 also performs the process steps of receiving wagers, determining the sportsbook liability, and mitigating liability with the blind sport betting wager.

In FIG. 5, the sportsbook betting engine 12 receives $50 wagers from player 1 at block 502, player 2 at block 504, and player 3 at block 506. In this illustrative embodiment, each of the players 1-3 wager $50 for the same game outcome, namely, Team A wins vs Team B. The sports book betting engine 12 tracks and aggregates the wager amounts as a function of each specified future outcome, i.e., total dollars bet on each event outcome.

Player 4 is a blind bettor and at block 514, the blind bettor is expressing a desire for "action" by wagering $150 on the Team A vs. Team B game. However, the blind bettor does not specify or indicate the winning team. The illustrative blind bettor user interface 400 is shown in FIG. 4 above. Note, even though the blind bettor is prompted to select the outcome type 404, the selection relates to the type of wager—in other words, the blind bettor is selecting to wager on a game outcome that relates to the winning team. However, the blind bettor is not indicating which team is the winning team. Thus, the blind bettor is getting some "action" without having to select the winning team. The blind sport betting system 30 selects the winning team, which in this example is Team B.

In operation, three wagers of $50 are received at blocks 502, 504, and 506, in which each of the three players predicts the event outcome to be that team A wins. The sports betting engine 12 receives the wagers and inputs these wagers into the blind sport betting system 30. The blind sport betting system 30 then proceeds to determine the sportsbook liability by proceeding to block 508 where the Team A win liability is calculated by summing the wagers for the Team A win.

After calculating the sportsbook liability of $150 at block 508, the method proceeds to block 510 where the blind sports betting module 30 determines the wagers that are currently uncommitted to an outcome. More specifically, player 4 provided a wager amount of $150 but did not commit the $150 to a particular outcome. Player 4 is interested in action between Team A and Team B and willing to wager $150.

Since Player 4 did not select the winning team and this selection process is left to the blind sports betting module 30, the blind sports betting module 30 communicates the Team B winning outcome selection to player 4 as represented by arrow 516.

At block 512, the sportsbook liability, as function of event outcomes, is recalculated and the liability is $0 because the liability for a Team A win matches the liability for a Team B win.

More generally, the sport betting method presented in FIG. 5 includes a plurality of standard client devices, in which each standard client device includes a user interface that receives a wager amount and a user-selected binary outcome for the sportsbook outcome. The blind sport betting module 30 determines the potential sportsbook loss for the sportsbook outcome by aggregating the wager amounts for the user-selected binary outcomes. Additionally, the sport betting method in FIG. 5 may include a plurality of blind bet client devices (not shown), in which each blind bet client device receives a wager amount and a blind bet binary outcome from the blind sport betting module.

Figure 6:
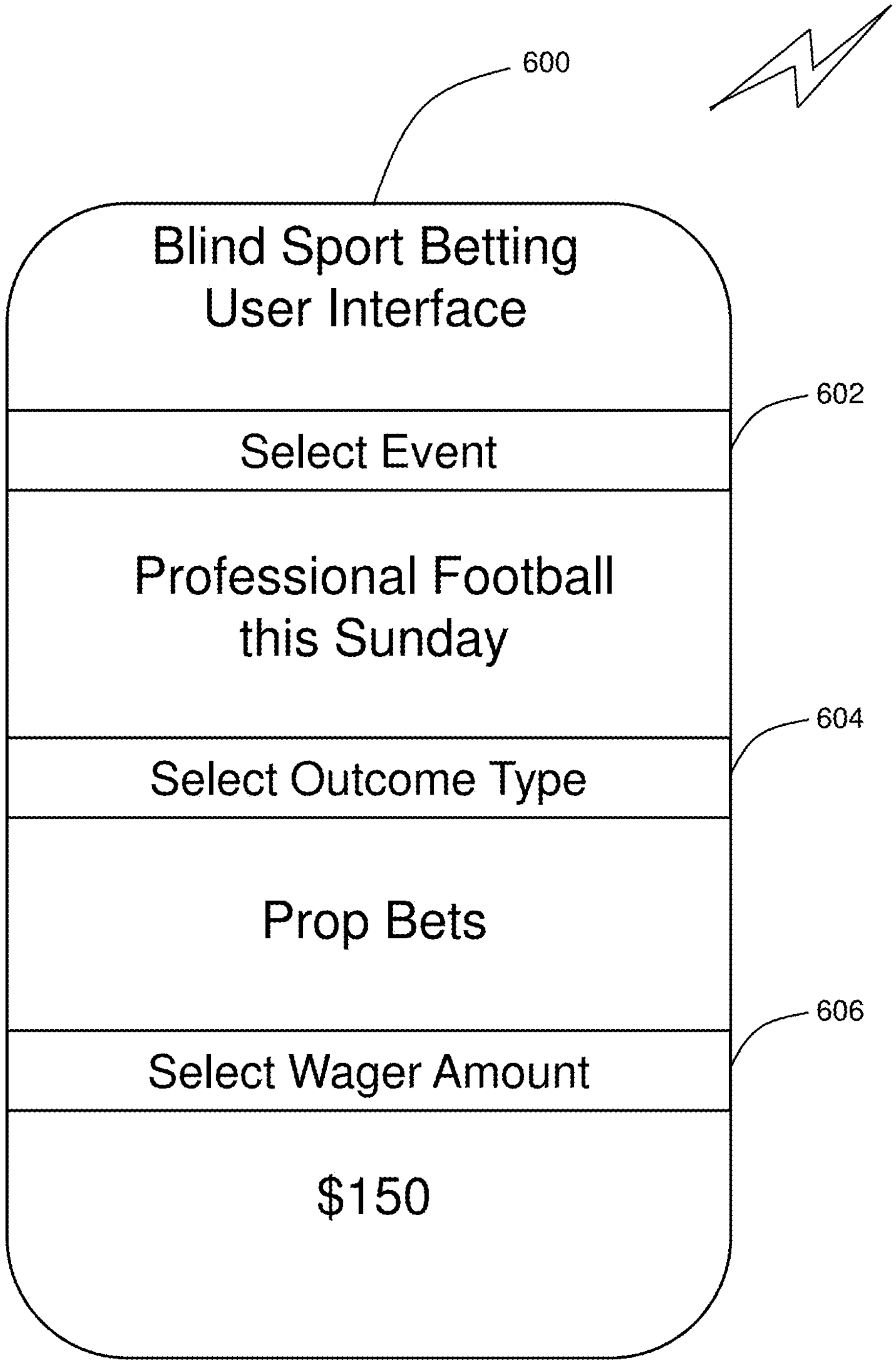
FIG. 6 shows an illustrative smartphone user interface that receives a blind sport betting wager for a basic "prop" bet.

Referring to FIG. 6, there is shown an illustrative smartphone user interface that receives a blind sport betting wager for a basic "prop" bet. In this illustrative embodiment, the user interface 600 is presented to a blind bettor. The blind bettor selects the event 602, which is professional football this Sunday. Additionally, the blind bettor wagers $150 by selecting the wager amount 606 for any "prop bet" outcome identified by the select outcome type 604.

As previously stated, a prop bet is more formally referred to as a "proposition wager," in which the wager is not directly based on the final outcome of the event, i.e., a winning or losing game outcome. Illustrative prop bets are described in FIG. 7 and FIG. 9 in further detail below.

Figure 7:
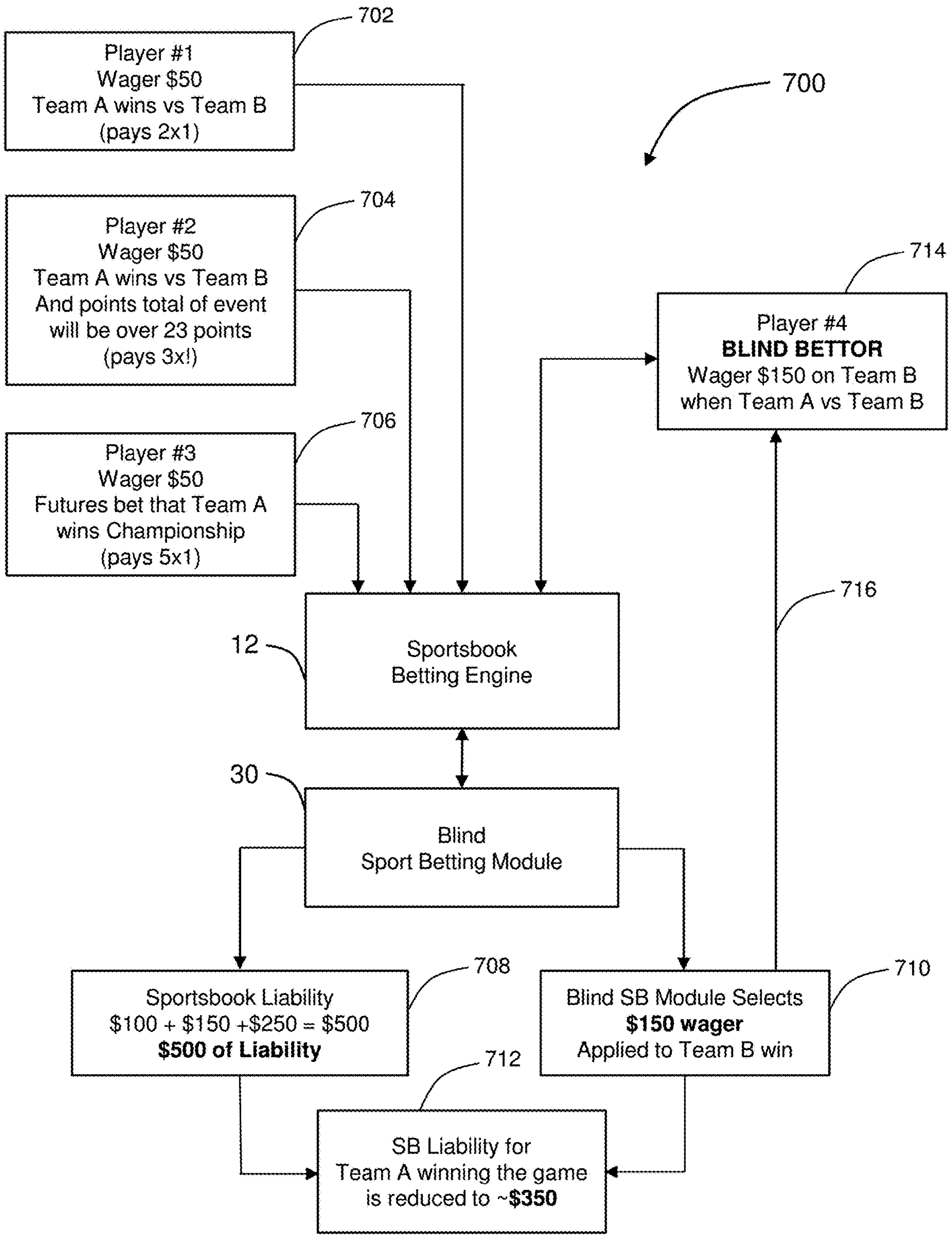
FIG. 7 shows a second illustrative operational flow chart for the blind sport betting system that results in reduced sportsbook liability for a prop bet.

Referring to FIG. 7, there is shown a second illustrative operational flow chart for the blind sport betting system that results in reduced sportsbook liability for a prop bet. The operational flow chart presents an illustrative method that begins at block 702, in which player 1 makes a $50 wager that Team A wins. Additionally, at block 702, team B is the two to one favorite, so the pay out at portal 102 if team A wins is $100.

At block 704, player 2 also selects a $50 wager that team A wins and the total points scored will be over 23. At the time of the wager the odds of this happening were set at three to one (3:1), so the liability for this wager if team A wins is $150.

At block 706, a player 3 inputs a $50 wager that is a "futures bet" that Team A wins the championship and makes this futures bet wager before the season starts. The odds for the futures wages are five to one (5:1) so the liability for this wager if team A wins is $250 to the sportsbook. A "futures bet" is a wager placed for an outcome that will happen over the course of a longer period of time, generally the result of many individual outcomes. For example, betting that a specific team will win a championship prior to the season starting.

The sportsbook betting engine 12 receives the wagers from block 702, 704, and 706 and then passes the wagers to the blind sport betting system 30. At block 708, the blind sport betting system 30 determines that if all three wagers have predicted the correct event outcome the total sportsbook liability is $500.

After calculating the sportsbook liability of $150 at block 708, the method proceeds to block 710 where the blind sports betting module 30 determines the wagers that are currently uncommitted to an outcome, which is $150. Recall that player 4 wagered $150 in FIG. 6. However, even though player 4 provided a wager amount of $150, player 4 did not commit the $150 to a particular outcome. Again, player 4 is interested in action between Team A and Team B and willing to wager $150.

Since Player 4 did not select the winning team and this selection process is left to the blind sports betting module 30, the blind sports betting module 30 communicates the Team B winning outcome selection to player 4 as represented by arrow 716.

At block 712, the sportsbook liability, as a function of event outcomes, is recalculated and the lability is reduced to $350 because the liability for a Team A win is $500 and the liability for a Team B win is $150. Thus, the sportsbook liability for Team A winning the game is reduced to 350.

Figure 8:
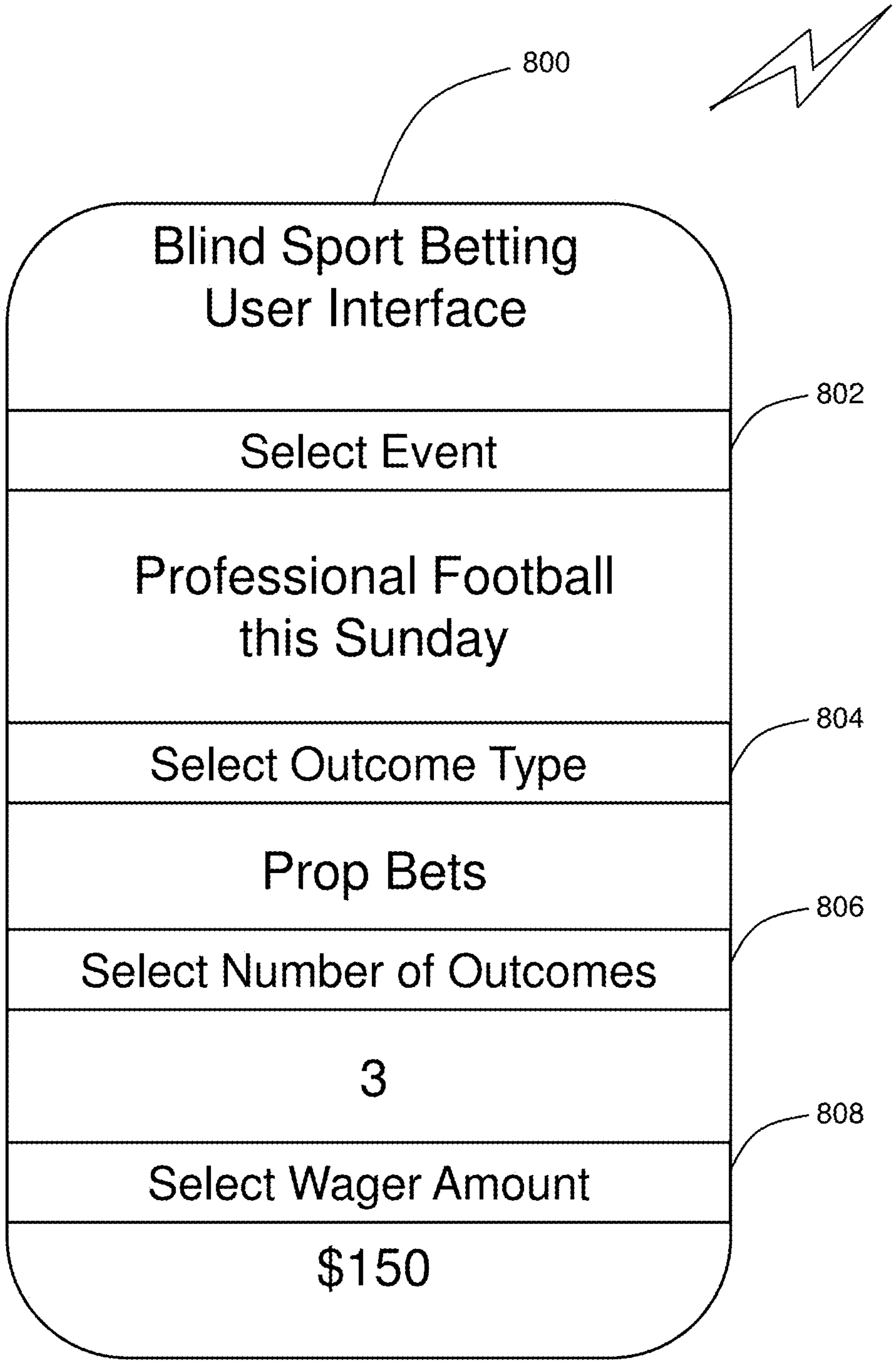
FIG. 8 shows an illustrative smartphone user interface for a third illustrative embodiment, in which the blind sport betting user interface receives a $150 wager for three "prop" bet outcomes.

Referring to FIG. 8 there is shown an illustrative smartphone user interface for a third illustrative embodiment, in which the blind sport betting user interface receives a $150 wager for three "prop" bet outcomes.

In this embodiment, the user interface 800 is presented to a blind bettor which selects the event 802, i.e., professional football this Sunday. Additionally, the blind bettor wagers $150 by selecting the wager amount 808 for any "prop bet" outcome identified by the select outcome type 804. Additionally, at the selected number of outcomes prompt 806, the blind bettor indicates they want to select three (3) outcomes. Thus, the blind bet is distributed across three distinct blind bets which gives the player a sense of participation and control in a blind bet wager resulting in increased player engagement further increasing the amount and frequency of the wagers and the opportunity for an increase in revenue for the sports book operator.

Figure 9:
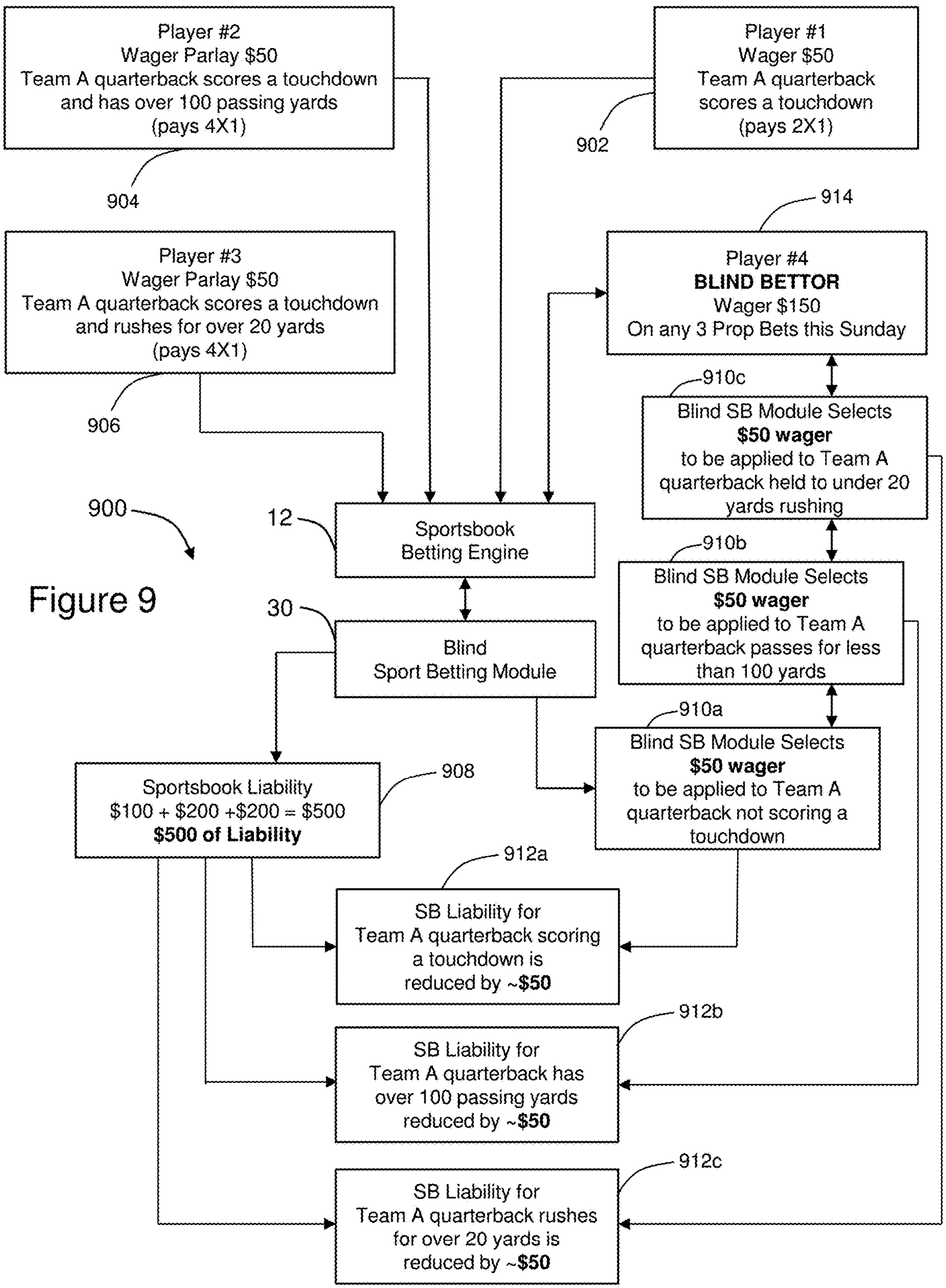
FIG. 9 shows a third illustrative operational flow chart for three "prop" bet outcomes presented in FIG. 8.

Referring to FIG. 9, there is shown a third illustrative operational flow chart for three "prop" bet outcomes, such as those presented in FIG. 8. In this illustrative method embodiment 900, the blind sport betting system 30 is capable of not only receiving and processing several prop bets, but also distributing the blind bet across a number of wagers, including prop bets, to offset the liability of the sportsbook betting engine 12. In the illustrative method embodiment 900, blind prop bets are created to offset sportsbook liability and encourage players to participate in wagering.

At block 902, player 1 makes a $50 wager at portal 102 that a quarterback for Team A will score a touchdown in a to be played event against Team B. At the time of the wager, the odds of this happening are set at two to one (2:1), so the pay out by the sportsbook engine 12 if the quarterback for Team A scores a touchdown is $100.

At block 904, player 2 selects a $50 dollar wager that a quarterback for Team A will score a touchdown in a to be played event against Team B and he will have over 100 passing yards. At the time of the wager, the odds of this happening were set at four to one (4:1), so the liability for this wager to the sportsbook engine 12 if team A quarterback scores a touchdown and has over 100 passing yards is $200.

At block 906, player 3 selects a $50 dollar wager that a quarterback for Team A will score a touchdown in a to be played event against Team B and the quarterback will have over 20 rushing yards. At the time of the wager, the odds of this happening were set at four to one (4:1), so the liability to the sportsbook betting engine 12 for this wager if Team A quarterback scores a touchdown and the quarterback has over 20 rushing yards is $200.

After calculating the sportsbook liability of $500 at block 908, the method proceeds to blocks 910*a*, 910*b*, and 910*c* where the blind sports betting module 30 determines the wagers that are currently uncommitted to an outcome, which is $150. Recall that player 4 wagered $150 in FIG. 8 with three prop bet outcomes. However, even though player 4 provided a wager amount of $150, player 4 did not commit the $150 to a particular outcome. Since Player 4 did not select the winning prop bets and this selection process is left to the blind sports betting module 30, the blind sports betting module 30 communicates that a $50 wager has been placed on the Team A quarterback NOT scoring a touchdown at block 910*a*. At block 910*b*, the blind sport betting system 910*b* communicates that the $50 wager is to be applied to Team A quarterback passing for less than 100 yards. At block 910*c*, a $50 wager to be applied to Team A quarterback being held to under 20 yards rushing is communicated to the blind bettor player 4.

At blocks 912*a*, 912*b*, and 912*c*, the sportsbook liability as a function of event outcomes is recalculated and the total liability is reduced by $150 because the liability at blocks 912*a*, 912*b*, and 912*c* is reduced by $50 for each prop bet. Thus, the sportsbook liability for the three prop bets is reduced 350.

Sportsbook operator 110 determines, in a process 414, that if all three wagers have predicted the correct event outcome the total liability is $500.

Figure 10A:
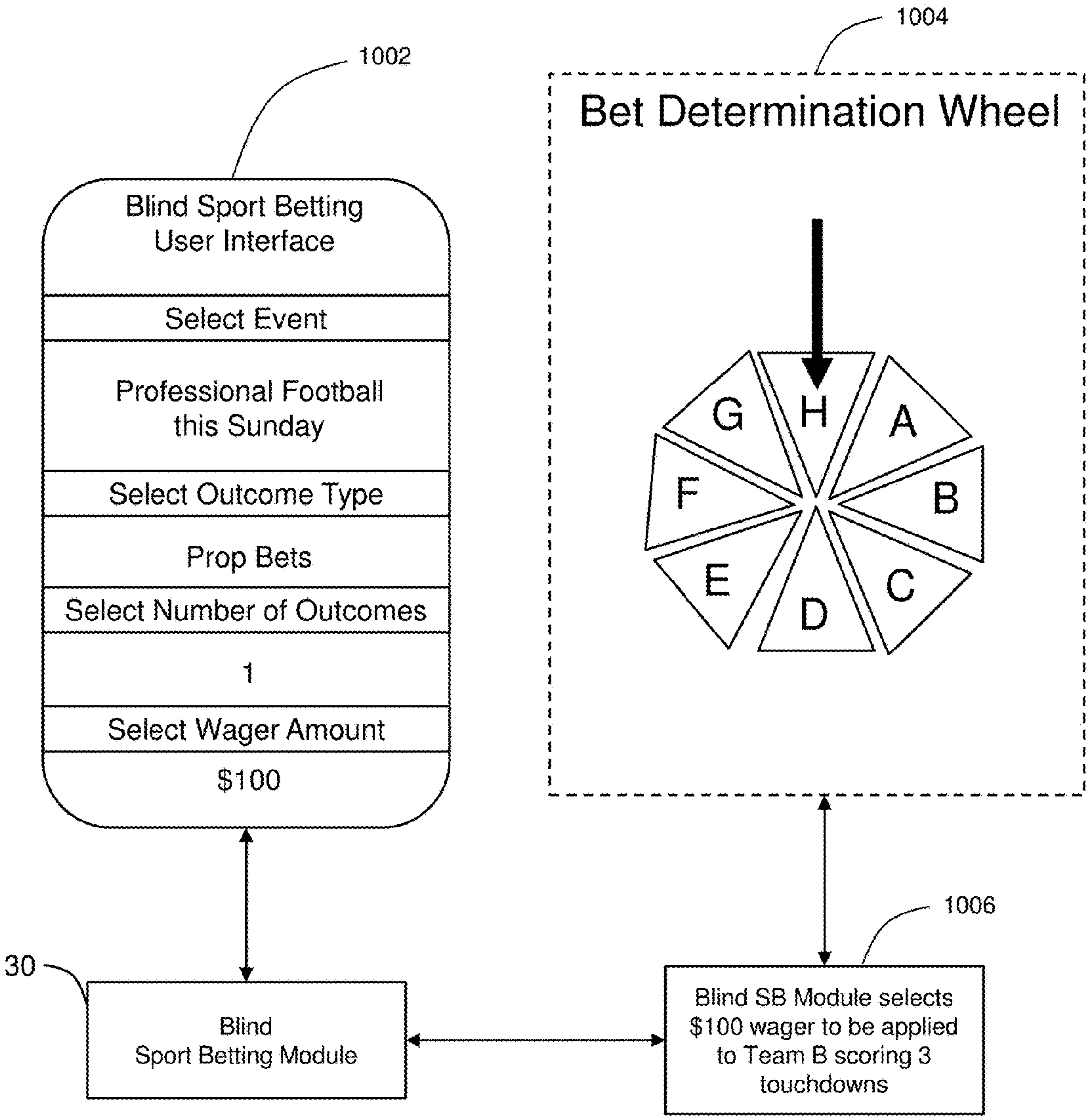
FIG. 10A shows an illustrative smartphone user interface that interfaces with a bet determination wheel and blind sport betting module.
Figure 10B:
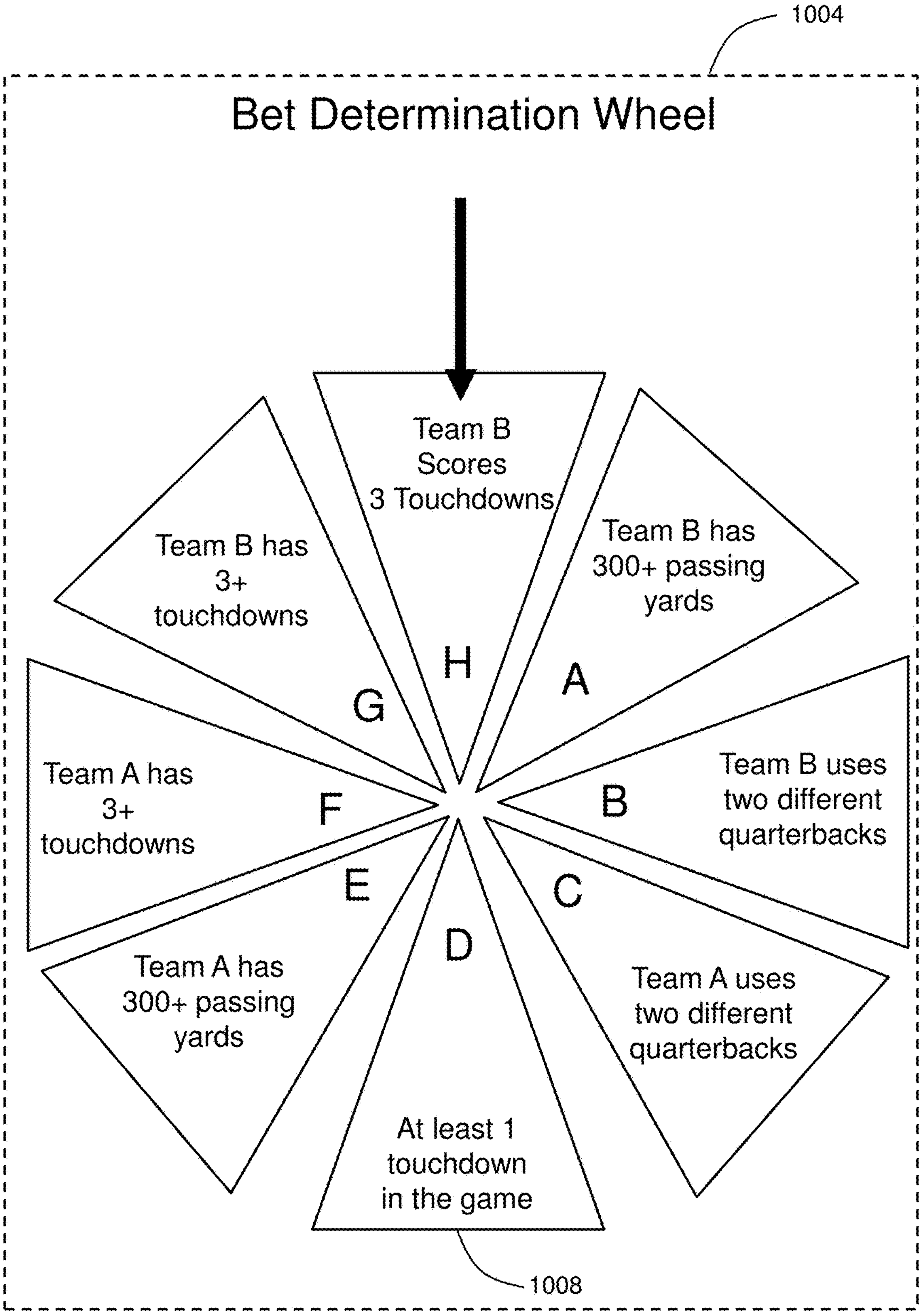
FIG. 10B shows an exploded view of the various outcomes associated with the illustrative bet determination wheel shown in FIG. 10A.

Referring to FIG. 10A and FIG. 10B, there is shown an illustrative smartphone user interface that interfaces with a bet determination wheel and blind sport betting module. In this illustrative embodiment, the user interface 1002 is directed to a prop bet having a single outcome and the wager amount is $100. Thus, only a single blind bet is selected by the blind sport betting system 30. More specifically, the player selects professional football as a type of event, a prop bet limited to the selected event, a single prop bet for $100. As described above, blind sport betting system 30 determines a prop bet that mitigates risk for sportsbook operator 110.

However, in this illustrative embodiment, the selection of the blind prop bet is performed by blind sport betting system 30 instructing the bet determination wheel 1004 to select one outcome out of the eight (8) possible outcomes. More specifically, the bet determination wheel selects outcome H, which corresponds to a $100 wager to be applied to Team B scoring three (3) touchdowns 1006.

Referring to FIG. 10B there is shown an exploded view of the various outcomes associated with the illustrative bet determination wheel shown in FIG. 10A. The blind sport betting system 30 activates the bet determination wheel 1004, which then selects one prop bet.

In operation, the bet determination wheel 1004 is presented to the blind bettor's user interface as a spinning wheel. By way of example and not of limitation, the bet determination wheel 1004 includes an illustrative random number generator that randomly selects one prop bet out of the total possible eight (8) outcomes. As the wheel spins, the outcome reflected when the wheel stops is shown as the prop bet outcome to the blind bettor.

Additionally, the various prop bet outcomes displayed on the bet determination wheel can be changed or modified to entice players. For example, the sportsbook could further entice players to blind bets by changing the prop bet outcomes and include some high probability wagers such as, "at least one touchdown," as an outcome on the wheel shown as prop bet outcome 1008 in FIG. 10B. Also, the blind sport betting module can interface with other games of chance such as a slot machine, pachinko machine, roulette machine, social casino games, progressive games, and other such games of chance. In yet another embodiment, the sportsbook may offer additional incentives to encourage a player to make a blind bet, such as a lower vigorish (higher payout), higher winning odds than determined, a future free bet or the like.

Although the embodiments presented above focus on reducing sportsbook liability, there may be instances where the casino operator may want to increase game volatility which results in increased sportsbook liability. Since each sportsbook determines the payout of each future outcome, the sportsbook may at times increase the liability of the sportsbook using blind bets if the sportsbook algorithms have determined that a certain outcome is more likely than the market, or the public believes. In such instances, blind bets may be used to not mitigate liability, but to increase liability and increase overall casino revenue—if the predicted event outcome is actualized.

The sportsbook may also use blind bets as an incentive to educate a player to bet on a new form of event outcome for which the Player has never placed a wager. For example, a player may generally place bets solely on which team will win a game. The sportsbook operator may offer the player a free $5 in-game blind bet on the game for which the player placed their original wager, allowing the player to experience action on an in-game outcome in hopes that the player will place wagers on in-game outcomes in the future, thereby driving incremental wagering. An in-game wager is a wager placed while an event is taking place—so the outcome of these wagers is determined before the completion of the event and may also be applied to prop-bets.

In another illustrative embodiment, blind sport betting system 30 informs the sportsbook betting engine 12 of events that have liabilities above a certain threshold. In response, the sportsbook betting engine can then advertise blind bets associated with specific events with the intention of placing those blind bets for event outcomes that require reducing the sportsbook liability.

The combination of the blind sport betting system 30, blind sport betting module 32, sports betting engine 12 (also referred to as sports betting liability management system) may also permit the sportsbook operator to predict future quantity and value of blind bets for a specific event outcome using analysis of historic betting patterns.

The systems and methods described above provide analytics that can be used to create a feedback loop. More specifically, the blind sport betting system 30, blind sport betting module 32 and sports betting engine 12 generate historical data that includes quantity, velocity, and value of blind bets for different bets and event outcomes. The sportsbook operator can then use this historical data to predict the amount and types of blind bets they expect to get for future events, which the sportsbook operator can then use to set a better, more informed line and/or price than other sportsbooks for those future events. Allowing the sportsbook to set a different, better price, for the lines they are putting out. For example, the sportsbook may set a generous Team A line to entice people to bet, driving incremental revenue, and because the sportsbook anticipates it will receive sufficient blind bets to offset the sportsbook liability associated with the generous Team A line, they have generated incremental revenue without taking on incremental risk. The more blind bets the system encounters, the better predictions the system can make for future events, which the sportsbook operator can then use to entice more bets, and the feedback look continues and becomes stronger.

It is to be understood that the detailed description of illustrative embodiments is provided for illustrative purposes. The scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A sport betting system that mitigates risk to a sportsbook operator, the sport betting system comprising:

a first client device that displays a first user interface that receives a first wager amount associated with a sportsbook outcome and requests a blind bet binary outcome;

wherein the first user interface is absent a first user-selected binary outcome associated with a sportsbook outcome;

a second client device that displays a second user interface that receives a second wager amount and a second user-selected binary outcome associated with the sportsbook outcome;

a sportsbook network component including a blind sport betting module;

the sportsbook network component communicatively coupled to the first client device and the second client device, wherein the sportsbook network component receives the first wager amount, the request for the blind bet binary outcome, the second wager amount, and the second user-selected binary outcome associated with the second wager amount;

the blind sport betting module determines a potential sportsbook loss corresponding to the second wager amount and a second user-selected predicted outcome;

the blind sport betting module mitigates the potential sportsbook loss by determining the blind bet binary outcome that is in binary opposition to the second user-selected binary outcome; and the blind sport betting module communicates the blind bet binary outcome to the first client device.

2. The system of claim 1 further comprising a plurality of standard client devices, in which each standard client device includes a user interface that receives a wager amount and a user-selected binary outcome for the sportsbook outcome;

wherein the blind sport betting module determines the potential sportsbook loss for the sportsbook outcome by aggregating the wager amounts for the user-selected binary outcomes.

3. The system of claim 2 further comprising a plurality of blind bet client devices, in which each blind bet client device receives a wager amount and a blind bet binary outcome from the blind sport betting module.

4. The system of claim 1 wherein the sportsbook outcome includes a final game outcome.

5. The system of claim 1 wherein the sportsbook outcome includes at least one prop bet outcome.

6. The system of claim 1 wherein the first wager amount, the blind bet binary outcome, the second wager amount, and the second user-selected binary outcome associated with the second wager amount are received by the blind betting module before a resulting sportsbook outcome.

7. The system of claim 1 wherein the blind sports betting module includes a bet determination wheel that further includes a plurality of sportsbook outcomes, in which one of the sportsbook outcomes is randomly selected.

8. A sport betting system that mitigates risk to a sportsbook operator, the sport betting system comprising:

a first client device that displays a first user interface that receives a first wager amount associated with a sportsbook outcome and requests a blind bet binary outcome before a resulting sportsbook outcome;

a second client device that displays a second user interface that receives a second wager amount and a second user-selected binary outcome associated with the sportsbook outcome before the resulting sportsbook outcome;

a sportsbook network component including a blind sport betting module;

the sportsbook network component communicatively coupled to the first client device and the second client device, wherein the sportsbook network component receives the first wager amount, the request for the blind bet binary outcome, the second wager amount, and the second user-selected binary outcome associated with the second wager amount;

the blind sport betting module determines a potential sportsbook loss corresponding to the second wager amount and the second user-selected predicted outcome;

the blind sport betting module mitigates the potential sportsbook loss by determining the blind bet binary outcome that is in binary opposition to the second user-selected binary outcome; and the blind sport betting module communicates the blind bet binary outcome to the first client device before the resulting sportsbook outcome.

9. The system of claim 8 further comprising a plurality of standard client devices, in which each standard client device includes a user interface that receives a wager amount and a user-selected binary outcome for the sportsbook outcome;

wherein the blind sport betting module determines the potential sportsbook loss for the sportsbook outcome by aggregating the wager amounts for the user-selected binary outcomes.

10. The system of claim 8 further comprising a plurality of blind bet client devices, in which each blind bet client device receives a wager amount and a blind bet binary outcome from the blind sport betting module.

11. The system of claim 8 wherein the sportsbook outcome includes a final game outcome.

12. The system of claim 8 wherein the sportsbook outcome includes at least one prop bet outcome.

13. The system of claim 8 wherein the second wager amount, and the second user-selected binary outcome associated with the second wager amount are received by the blind betting module before the resulting sportsbook outcome.

14. The system of claim 8 wherein the blind sports betting module includes a bet determination wheel that further includes a plurality of sportsbook outcomes, in which one of the sportsbook outcomes is randomly selected.

15. A sports betting system comprising:

a sports betting liability management system;

two or more bettor user interfaces communicatively coupled to the sports betting liability management system; and a blind sports betting module configured to obtain liability offsets from the sports betting liability management system and configuring betting opportunities contra said liability offsets in whole or in part and present betting opportunities by and through the bettor interfaces for possible selection by the bettors.

16. The system of claim 15 further comprising a first bettor user interface associated with a first client device that displays the first bettor user interface, which receives a first wager amount associated with a sportsbook outcome; and a second bettor user interface associated with a second client device that displays a second user interface that receives a second wager amount and a second user-selected binary outcome associated with the sportsbook outcome before the resulting sportsbook outcome.

17. The system of claim 16 wherein the sports betting liability management system is communicatively coupled to the first client device and the second client device, and wherein the sports betting liability management system receives the first wager amount, the request for the blind bet binary outcome, the second wager amount, and the second user-selected binary outcome associated with the second wager amount.

18. The system of claim 17 wherein the blind sport betting module determines a potential sportsbook loss corresponding to the second wager amount and the second user-selected predicted outcome.

19. The system of claim 18 wherein the blind sport betting module mitigates the potential sportsbook loss by determining the blind bet binary outcome that is in binary opposition to the second user-selected binary outcome.

20. The system of claim 19 wherein the blind sport betting module communicates the blind bet binary outcome to the first client device before the resulting sportsbook outcome.

* * * * *